(12) United States Patent
Bauduin et al.

(10) Patent No.: US 10,167,895 B2
(45) Date of Patent: Jan. 1, 2019

(54) HYDRODYNAMIC BEARING

(71) Applicant: Safran Transmission Systems, Colombes (FR)

(72) Inventors: Lionel Bauduin, Houille (FR); Maxence Guillemont, Colombes (FR); Boris Morelli, Paris (FR); Julien Viel, Argenteuil (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 15/552,975

(22) PCT Filed: Feb. 23, 2016

(86) PCT No.: PCT/FR2016/050415
§ 371 (c)(1),
(2) Date: Aug. 23, 2017

(87) PCT Pub. No.: WO2016/135413
PCT Pub. Date: Sep. 1, 2016

(65) Prior Publication Data
US 2018/0017101 A1 Jan. 18, 2018

(30) Foreign Application Priority Data
Feb. 24, 2015 (FR) ...................................... 15 51550

(51) Int. Cl.
*F16C 17/02* (2006.01)
*F16C 33/10* (2006.01)
(Continued)

(52) U.S. Cl.
CPC .......... *F16C 17/026* (2013.01); *F01D 25/166* (2013.01); *F01D 25/186* (2013.01);
(Continued)

(58) Field of Classification Search
CPC .. F16C 17/026; F16C 33/064; F16C 33/0633; F16C 32/0644; F16C 33/103;
(Continued)

(56) References Cited

U.S. PATENT DOCUMENTS 2,498,011 A * 2/1950 Sherbondy .............. F16C 17/03
384/311
2,767,035 A * 10/1956 Von Euw ................ B61F 15/16
184/26
(Continued)

FOREIGN PATENT DOCUMENTS

CN 203441805 U * 2/2014 ............. F04D 29/06
DE 37 30 916 A1 3/1989
(Continued)

OTHER PUBLICATIONS

Search Report issued in French Patent Application No. 1551550 dated Jan. 25, 2016.
(Continued)

*Primary Examiner* — Marcus Charles
(74) *Attorney, Agent, or Firm* — Pearne & Gordon LLP

(57) ABSTRACT

To overcome defects in the supply of pressurized lubricant, a hydrodynamic bearing for guiding a shaft (14) includes a stationary outer annular wall, a rotatable inner annular wall (20), and a space (22) between the walls. The outer annular wall comprises an opening for supplying pressurized lubricant to the space so as to form a film of load-bearing fluid. The bearing includes a cavity (30) externally defined by the inner annular wall (20) and axially defined by two transverse annular walls (31A, 31B) secured to the shaft (14) and arranged on both sides of the cavity. The inner annular wall (20) comprises fluid connection orifices (32) connecting the cavity (30) to the space (22). The cavity (30) is divided into compartments (50, 52) by a partition wall (48) configured such that the cavity forms a lubricant supply for a transient operational phase.

10 Claims, 7 Drawing Sheets

(51) Int. Cl.
*F01D 25/18* (2006.01)
*F16C 33/66* (2006.01)
*F16C 32/06* (2006.01)
*F01D 25/16* (2006.01)
*F04D 29/047* (2006.01)

(52) U.S. Cl.
CPC .......... *F16C 17/02* (2013.01); *F16C 32/0644* (2013.01); *F16C 33/103* (2013.01); *F16C 33/106* (2013.01); *F16C 33/107* (2013.01); *F16C 33/1045* (2013.01); *F04D 29/047* (2013.01); *F16C 33/1085* (2013.01); *F16C 2360/23* (2013.01)

(58) Field of Classification Search
CPC .. F16C 33/106; F16C 33/107; F16C 33/1045; F16C 33/1065; F16C 33/1084; F16C 33/66; F16C 33/664; F16C 33/6659; F16C 2360/23; F16C 32/064; F16C 32/0633; F04D 29/047; F01D 25/162; F01D 25/18; F01D 25/186
USPC ....... 384/114, 118, 123, 291, 306, 316, 322, 384/385, 289, 369, 373, 377, 381; 415/111
See application file for complete search history.

(56) References Cited

U.S. PATENT DOCUMENTS

| | | | | |
|---|---|---|---|---|
| 3,242,360 A * | 3/1966 | Carle | ................... | F04D 29/586 310/54 |
| 3,941,434 A * | 3/1976 | Schurger | ............ | F16C 32/0659 384/120 |
| 3,964,805 A | 6/1976 | Schulien | | |
| 4,271,928 A | 6/1981 | Northern | | |
| 4,583,870 A * | 4/1986 | Schnittger | ................ | F16C 17/02 384/114 |
| 5,593,232 A * | 1/1997 | Maier | ..................... | F16C 17/03 384/117 |
| 7,845,855 B2 * | 12/2010 | Bischof | ................. | F16C 17/035 384/117 |
| 9,410,572 B2 * | 8/2016 | Shoup | ................... | F16C 17/028 |
| 9,677,663 B2 * | 6/2017 | Sammataro | ......... | F16H 57/0442 |
| 2003/0107183 A1* | 6/2003 | Wilkinson | ............. | F16J 15/183 277/510 |
| 2007/0126285 A1* | 6/2007 | Murakami | ........... | B62D 55/092 305/138 |
| 2016/0090871 A1* | 3/2016 | Olsen | .................. | F16C 33/6685 416/174 |
| 2016/0258322 A1* | 9/2016 | Winn | .................... | F01D 25/145 |
| 2016/0333792 A1 | 11/2016 | Viel | | |
| 2017/0101926 A1* | 4/2017 | Chiang | .................. | F02B 53/02 |

FOREIGN PATENT DOCUMENTS

| | | |
|---|---|---|
| EP | 0 006 095 A1 | 1/1980 |
| FR | 2 431 028 A1 | 2/1980 |

OTHER PUBLICATIONS

International Search Report issued in Application No. PCT/FR2016/050415 dated Jun. 9, 2016.

Written Opinion issued in Application No. PCT/FR2016/050415 dated Jun. 9, 2016.

* cited by examiner

HYDRODYNAMIC BEARING

CROSS REFERENCE TO RELATED APPLICATIONS

This application is the national stage of International Application No. PCT/FR2016/050415, filed Feb. 23, 2016.

TECHNICAL FIELD

This invention relates to the field of hydrodynamic bearings, in particular for aircraft turbomachines.

PRIOR ART

A hydrodynamic bearing intended to guide a shaft in rotation relative to a support, generally comprises an outer annular bearing wall secured to the support, and an inner annular bearing wall secured to the shaft and extending opposite the outer annular bearing wall so as to provide an annular space between the inner and outer annular bearing walls. Moreover, the outer annular bearing wall comprises at least one lubricant supply orifice for supplying pressurised lubricant to the annular space so as to form a load-bearing fluid film between the inner and outer annular bearing walls.

However, in the event of a lubricant shortage or supply failure, the bearing runs the risk of entering a "dry running" mode wherein the inner and outer annular bearing walls run the risk of coming into contact with each other and causing damage to the bearing.

This type of situation in particular arises in turbomachines used to power aircraft.

Indeed, in such a turbomachine, the lubricant is generally supplied by a pump driven by a rotor of the turbomachine. For this purpose, the pump is typically coupled to an accessory gear box, sometimes referred to under the acronym AGB, itself coupled to the rotor.

On starting up the turbomachine, the pump's operating mode can prove to be insufficient in guaranteeing a satisfactory lubricant flow within the annular space between the inner and outer annular bearing walls.

This is particularly the case with regard to a hydrodynamic bearing supporting a shaft forming a part of the accessory gear box, given that such a shaft is particularly solicited upon start-up of the turbomachine. Indeed, such a start-up can be accomplished by means of a starter motor connected to the accessory gear box, and thus driving the rotor of the turbomachine in rotation via the aforementioned shaft.

BRIEF SUMMARY OF THE INVENTION

The purpose of the invention is in particular to provide a simple, low-cost and effective solution to this problem.

For this purpose, it proposes a hydrodynamic bearing intended to guide a shaft in rotation about a longitudinal axis defined in relation to a support, wherein the hydrodynamic bearing includes a stationary outer annular bearing wall, and a rotatable inner annular bearing wall extending opposite the outer annular bearing wall so as to provide an annular space between the inner and outer annular bearing walls. Moreover, the outer annular bearing wall comprises at least one lubricant supply orifice for supplying pressurised lubricant to the annular space so as to form a load-bearing fluid film.

According to the invention, the assembly includes a cavity externally defined by the inner annular bearing wall and axially defined by two transverse annular walls secured to the inner annular bearing wall and arranged on both sides of the cavity, and the inner annular bearing wall comprises fluid connection means that place the cavity in fluid communication with the annular space. Furthermore, the cavity is arranged so as to form a lubricant reserve for a transient operating phase.

In steady-state operation, the shaft is driven in rotation, and the lubrication circuit supplies pressurised lubricant to the annular space via each lubricant supply orifice. Part of the lubricant therefore penetrates the aforementioned cavity, through the fluid connection means.

When the shaft stops rotating, the cavity constitutes a lubricant reserve. The quantity of lubricant that can be stored in the cavity varies depending on the angular position and incline of the shaft.

When the shaft then starts to rotate again, if the lubrication circuit is delayed in supplying lubricant to the annular space via each lubricant supply orifice, the lubricant potentially stored in the cavity is progressively injected by the fluid connection means into the annular space, under centrifugal force. This lubricant originating from the cavity is used to form a thin layer of lubricant between the outer annular bearing wall and the inner annular bearing wall, enabling the hydrodynamic bearing to operate at least in a so-called "boundary" lubrication mode.

The same phenomenon occurs in all other types of transient operating conditions, characterised by a pressurised lubricant supply failure.

In general, the seizing of the hydrodynamic bearing can thus be avoided.

According to the broadest aspect of the invention, some specific positions of the shaft may not allow lubricant to be held in the cavity. Nonetheless, in most situations, the invention allows a quantity of lubricant to be stored in the cavity, the quantity being sufficient for operation of the hydrodynamic bearing in a "boundary" lubrication mode.

The fluid connection means preferably comprise a plurality of lubricant flow orifices that pass through the inner annular bearing wall and that are regularly distributed about the longitudinal axis.

Such a configuration optimises the balance of the shaft in rotation.

Moreover, the hydrodynamic bearing advantageously comprises a ring mounted on the shaft such that it can be removed therefrom, the ring integrating the inner annular bearing wall in addition to the transverse annular walls.

Furthermore, the cavity can be internally defined by a solid surface of the shaft.

Alternatively, the ring can comprise an inner annular ring wall that internally defines the cavity.

Also alternatively, the inner annular bearing wall and the transverse annular walls can be integrated into the shaft.

Moreover, the hydrodynamic bearing preferably comprises partitioning means connected to the inner annular bearing wall so as to divide the cavity into a plurality of compartments, the partitioning means forming an obstacle to a flow of lubricant contained in at least one of the compartments under gravitational force, towards the fluid connection means, regardless of the angular position of the shaft when the shaft is at a standstill.

The partitioning means therefore ensure that the lubricant can be stored in the cavity, regardless of the angular position of the shaft when the latter is at a standstill.

In a first preferred embodiment of the invention, the partitioning means comprise a partition wall of annular shape, dividing the cavity into two compartments arranged one behind the other along the longitudinal axis. Moreover, the partition wall comprises at least one opening defined by the inner annular bearing wall and circumferentially offset relative to the fluid connection means.

Each opening allows lubricant to flow between the two compartments of the cavity when the shaft is driven in rotation, and thus allows the entire quantity of lubricant present in the cavity to reach the fluid connection means.

The partition wall preferably extends transversally relative to the longitudinal axis.

The at least one opening advantageously consists of a plurality of openings regularly distributed about the longitudinal axis.

Such a configuration further optimises the balance of the shaft in rotation.

In a second preferred embodiment of the invention, the partitioning means comprise partition walls extending longitudinally from one to the other of the transverse annular walls so as to divide the cavity into a plurality of compartments distributed about the longitudinal axis. Furthermore, the partition walls are circumferentially offset relative to the fluid connection means.

The partition walls preferably extend radially relative to the longitudinal axis and are preferably regularly distributed about the longitudinal axis.

Such a configuration further optimises the balance of the shaft in rotation.

Moreover, the partition walls advantageously have at least one concave surface, and preferably two opposite concave surfaces, so as to optimise the capacity of the partition walls to hold lubricant.

Preferably, the number of partition walls is equal to the number of lubricant flow orifices, and the partition walls are diametrically opposite relative to the lubricant flow orifices when the hydrodynamic bearing is observed in a cross-sectional view.

In a third preferred embodiment of the invention, the partitioning means divide the cavity into a plurality of compartments circumferentially offset relative to the fluid connection means and regularly distributed about the longitudinal axis, and into a distribution channel connecting each compartment to the fluid connection means and comprising a circumferential portion that is axially offset on a same side relative to each compartment and relative to the fluid connection means, in addition to first connection portions that respectively connect the compartments of the cavity to the circumferential portion of the distribution channel and which are angularly offset relative to circumferential ends of each compartment.

Preferably, the fluid connection means are located axially on a same side of the circumferential portion of the distribution channel as the compartments of the cavity.

This specificity allows the lubricant to be stored in the circumferential portion of the distribution channel when the shaft is significantly inclined relative to the horizontal direction, such that the circumferential portion of the distribution channel is located in a low position.

The invention further relates to an assembly comprising a support, a shaft and a hydrodynamic bearing intended to guide the shaft in rotation about a longitudinal axis defined in relation to the support, wherein the hydrodynamic bearing includes an outer annular bearing wall secured to the support, and an inner annular bearing wall secured to the shaft and extending opposite the outer annular bearing wall so as to provide an annular space between the inner and outer annular bearing walls. Moreover, the outer annular bearing wall comprises at least one lubricant supply orifice for supplying pressurised lubricant to the annular space so as to form a load-bearing fluid film.

According to the invention, the assembly comprises a cavity externally defined by the inner annular bearing wall and axially defined by two transverse annular walls secured to the shaft and arranged on both sides of the cavity, and the inner annular bearing wall comprises fluid connection means that place the cavity in fluid communication with the annular space. Furthermore, the cavity is arranged so as to form a lubricant reserve for a transient operating phase.

The invention further relates to a turbomachine, in particular for an aircraft, comprising a support, a shaft and at least one hydrodynamic bearing of the type disclosed hereinabove, the outer annular bearing wall of which is secured to the support and the inner annular bearing wall of which is secured to the shaft, such that the hydrodynamic bearing contributes to the guiding of the shaft in rotation.

Preferably, the shaft forms a part of an accessory gear box of the turbomachine.

The invention finally relates to a method for lubricating a hydrodynamic bearing of the type disclosed hereinabove, comprising:

at least one transient operating phase wherein lubricant previously stored in the cavity is injected into the annular space by passing through the fluid connection means under centrifugal force, and a steady-state operating phase, wherein pressurised lubricant is supplied to the annular space through each lubricant supply orifice, and a part of the lubricant penetrates the cavity through the fluid connection moans.

In the steady-state operating phase, the lubricant originating from each lubricant supply orifice forms a load-bearing fluid film within the annular space.

In the transient operating phase, the lubricant originating from the cavity allows for at least the formation of a thin layer of lubricant enabling the hydrodynamic bearing to operate in a so-called "boundary" lubrication mode.

The transient operating phase is, for example, a start-up phase, in which the shaft is brought into rotation.

BRIEF DESCRIPTION OF THE FIGURES

The invention will be better understood, and other features, advantages and characteristics of the invention will appear upon reading the following description provided as a non-limiting example with reference to the accompanying figures, in which.

In all of these figures, identical references may represent identical or similar elements.

DETAILED DESCRIPTION OF THE PREFERRED EMBODIMENTS

Figure 1:
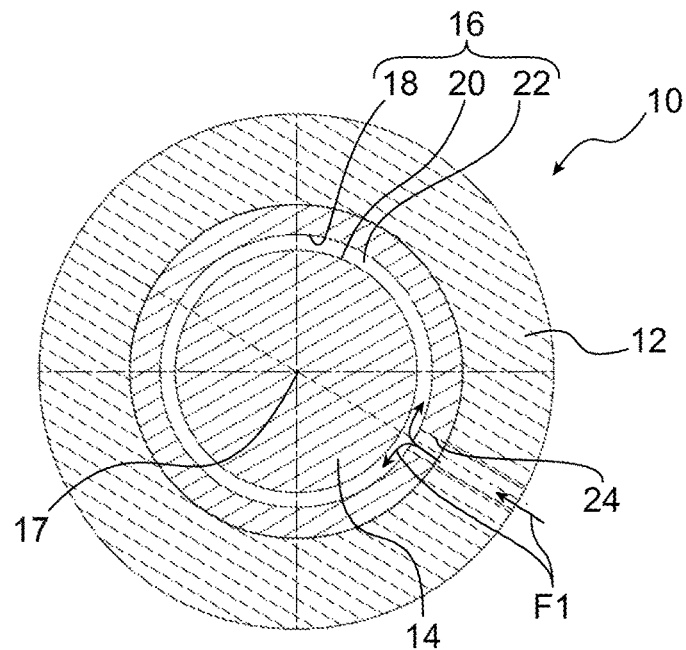
FIG. 1 is a partial diagrammatic view of a cross-section of a hydrodynamic bearing according to a first preferred embodiment of the invention.

FIGS. 1 to 9 show an assembly 10, comprising a support 12, a shaft 14, and a hydrodynamic bearing 16 according to a first preferred embodiment of the invention for guiding the shaft in rotation about a longitudinal axis 17. In this description, the longitudinal axis 17 is actually defined as being the rotational axis of the shaft 14.

Figure 2:
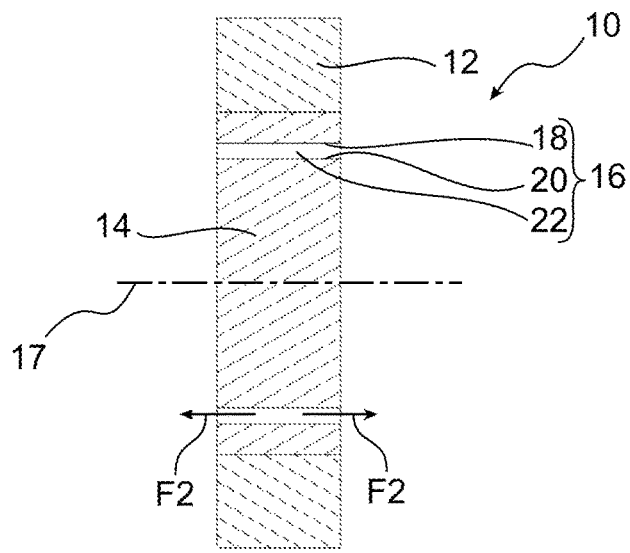
FIG. 2 is a partial diagrammatic view of an axial section of the hydrodynamic bearing shown in FIG. 1.
Figure 3:
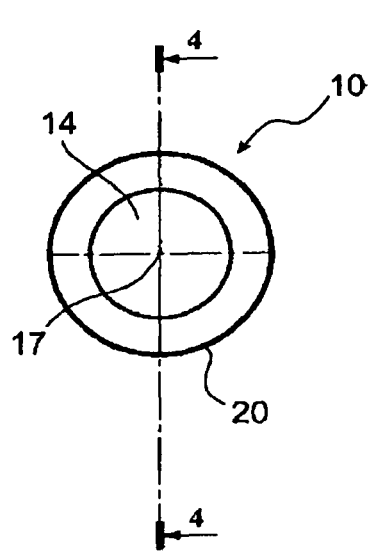
FIG. 3 is a partial diagrammatic front view of a shaft and a ring forming a part of the hydrodynamic bearing shown in FIG. 1.

The hydrodynamic bearing 16 comprises an outer annular bearing wall 18 secured to the support 12, in addition to an inner annular bearing wall 20 secured to the shaft 14 and extending opposite the outer annular bearing wall 18 (FIGS. 1 and 2). The annular walls 18 and 20 thus provide an annular space 22 therebetween. The annular walls 18 and 20 are preferably in the shape of an axisymmetric cylinder.

The outer annular bearing wall 18 comprises a lubricant supply orifice 24 intended to be connected to a lubrication circuit (not shown in the figures) to supply the annular space 22 with pressurised lubricant, so as to form a load-bearing fluid film within the annular space 22, in a known manner.

In the example provided, the outer annular bearing wall 18 is constituted from an anti-friction ring rigidly mounted in the support 12.

According to one feature of the invention, the hydrodynamic bearing 16 comprises a cavity 30 (FIGS. 4, 6 and 7) externally defined by the inner annular bearing wall 20 and axially defined by two transverse annular walls 31A, 31B secured to the shaft 14 and arranged on both sides of the cavity 30.

Moreover, the inner annular bearing wall 20 comprises fluid connection means 32 that place the cavity 30 in fluid communication with the annular space 22. The cavity 30 is intended to constitute a lubricant reserve, as shown more clearly hereinbelow.

It should be noted that the terminology "transverse walls" is understood in a broad sense, as defining walls extending in the direction of the shaft from the inner annular bearing wall 20. The transverse annular walls 31A, 31B can therefore extend radially, i.e. orthogonally to the longitudinal axis 17, or be inclined relative to the axis 17.

In the embodiments shown, the fluid connection means comprise a plurality of lubricant flow orifices 32, for example three thereof, which pass through the inner annular bearing wall. The lubricant flow orifices 32 are preferably regularly distributed about the longitudinal axis 17, which optimises the balance of the shaft 14 in rotation. The lubricant flow orifices 32 are preferably centred according to the same transverse plane, referenced B-B in FIG. 5, which further optimises the balance of the shaft 14 in rotation.

Alternatively, the fluid connection means can consist of a single lubricant flow orifice 32, without leaving the scope of the invention.

Figure 4:
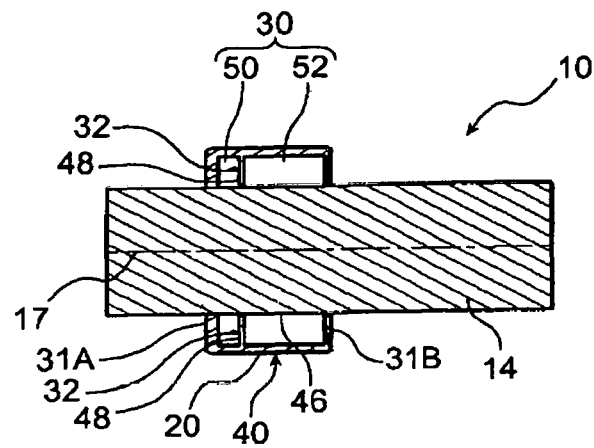
FIG. 4 is a partial diagrammatic view of an axial section of the shaft and ring in FIG. 3, along the plane 4-4 in FIG. 3.
Figure 5:
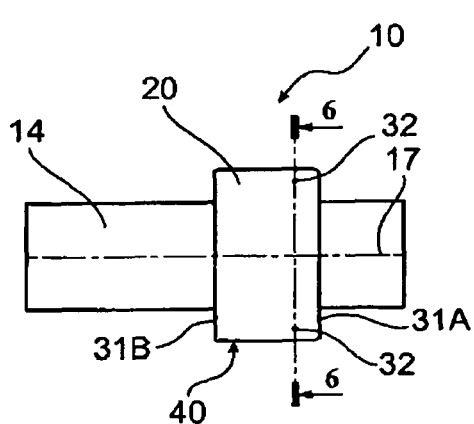
FIG. 5 is a partial diagrammatic side view of the shaft and ring in FIG. 3.

Moreover, in the embodiments shown in the figures, the hydrodynamic bearing 16 comprises a ring 40 mounted on the shaft 14 such that it can be removed therefrom, the ring 40 integrating the inner annular bearing wall 20 in addition to the two transverse annular walls 31A, 31B (FIG. 4).

Alternatively, the inner annular bearing wall 20 and the transverse annular walls 31A, 31B can be integrated into the shaft 14 without leaving the scope of this invention.

One 31B of the transverse annular walls comprises one or more air flow orifices 44, for example three thereof, in order to ease the variations in the volume of air contained in the cavity 30 so as to compensate for the variations in the volume of lubricant contained therein. The air flow orifices 44 are preferably regularly distributed about the longitudinal axis 17.

Figure 6:
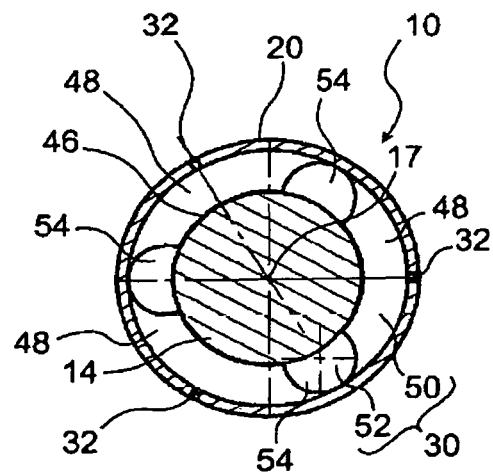
FIG. 6 is a partial diagrammatic view of a cross-section of the shaft and ring in FIG. 3, along the plane 6-6 in FIG. 5.

Moreover, in the two embodiments shown in FIGS. 1 to 12, the cavity 30 is internally defined by a solid surface 46 of the shaft 14 (FIGS. 4 and 6).

Moreover, the hydrodynamic bearing 16 comprises partitioning means connected to the inner annular bearing wall 20 so as to divide the cavity into a plurality of compartments. The partitioning means are intended to form an obstacle to a flow of lubricant contained in at least one of the compartments, towards the fluid connection means 32, under gravitational force, regardless of the angular position of the shaft when the shaft 14 is at a standstill, as shown more clearly hereinbelow.

Figure 7:
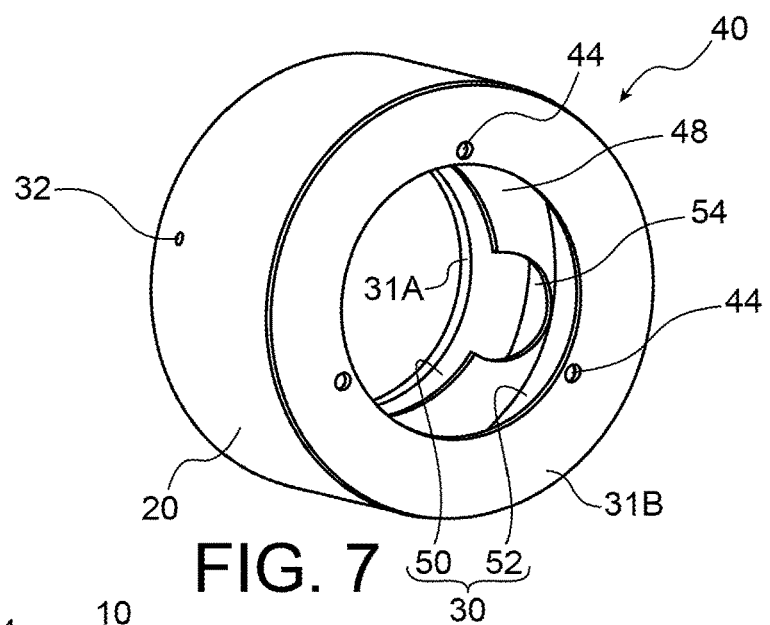
FIG. 7 is a perspective diagrammatic view of the ring in FIG. 3.

In the first preferred embodiment of the invention, the partitioning means comprise a partition wall 48 that is generally annular in shape, dividing the cavity 30 into two compartments 50 and 52 arranged one behind the other along the longitudinal axis 17 (FIGS. 4, 6 and 7). For the purposes of this description, the compartments will be referred to as the "front compartment 50" and the "rear compartment 52" hereinbelow.

In the example shown, the lubricant flow orifices 32 are therefore arranged on the same side relative to the partition wall 48 and thus all communicate with the front compartment 50 of the cavity 30.

It should also be noted that the lubricant flow orifices 32 are distanced from the transverse wall 31A that defines the front compartment 50.

Moreover, the partition wall 48 extends, for example, transversally relative to the longitudinal axis 17. Alternatively, other annular geometries are possible for the partition wall 48.

The partition wall 48 comprises at least one opening 54 defined by the inner annular bearing wall 20 and circumferentially offset relative to each lubricant flow orifice 32.

In the example shown, the partition wall 48 comprises three openings 54. These are regularly distributed about the longitudinal axis 17, which optimises the balance of the shaft 14 in rotation. Furthermore, each opening 54 is preferably arranged at an equal distance from two consecutive lubricant flow orifices 32 (FIG. 6). Each opening 54 is, for example, in the shape of a portion of disc at a tangent to the inner annular bearing wall 20.

In the example shown, each opening 54 extends as far as the radially inner end of the partition wall 48. Alternatively, each opening 54 can take on the shape of a notch formed in the radially outer end of the partition wall 48 in contact with the inner annular bearing wall 20, such that a radially inner portion of the partition wall 48 continuously extends around the longitudinal axis 17.

In general, the number of openings 54 can differ from the number of lubricant flow orifices 32 without leaving the scope of the invention.

The hydrodynamic bearing 16 disclosed hereinabove operates as follows.

In steady-state operation, the shaft 14 is driven in rotation, and the lubrication circuit supplies pressurised lubricant to the annular space 22 via the lubricant supply orifice 24, as shown by the arrows F1 in FIG. 1. Under the effect of pressure, the lubricant escapes through the axial ends of the annular space 22, in a conventional manner, as shown by the arrows F2 in FIG. 2.

A part of the lubricant nonetheless penetrates the cavity 30 through the lubricant flow orifices 32.

For this purpose, the lubrication circuit is configured such that the pressure of the lubricant is sufficient to compensate for the centrifugal effect to which the lubricant is subjected as a result of it being driven in rotation by viscosity on contact with the outer 18 and inner 20 annular bearing walls.

Figure 8:
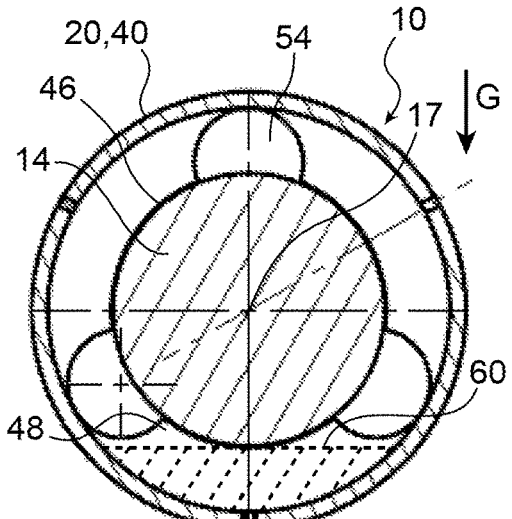
FIGS. 8 and 9 are similar views to that of FIG. 6, showing lubricant stored in the ring, respectively in two different angular positions of the ring.
Figure 9:
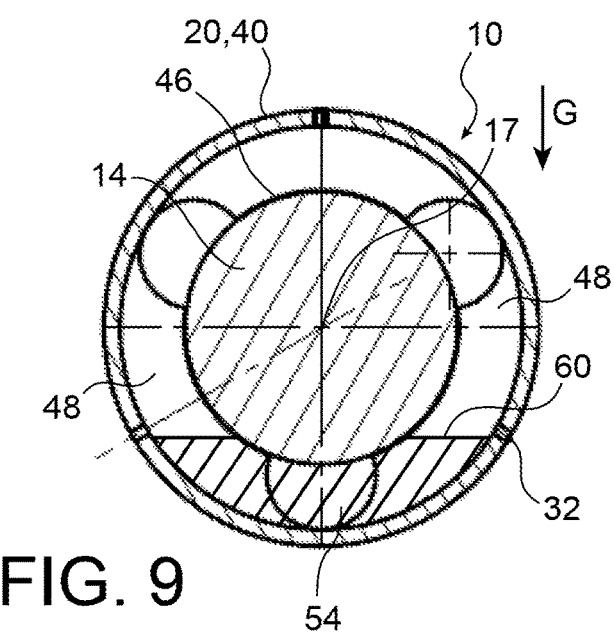

When the shaft 14 stops rotating, a part of the lubricant remains inside the cavity 30, regardless of the angular position of the shaft 14 and therefore of the ring 40, as shown in FIGS. 8 and 9.

Indeed, if the shaft 14 is in an angular position such that a lubricant flow orifice 32 is in a low position, as shown in FIG. 8, the lubricant potentially present in the front compartment 50 of the cavity 30 will flow through the lubricant flow orifice 32 into the annular space 22 under gravitational force G, and will potentially escape through the axial ends of the annular space 22. However, lubricant 60 potentially present in the rear compartment 52 of the cavity 30 is retained by the partition wall 48. The term "low position" must be understood as comprising a so-called "6 o'clock" position with reference to a clock face, whereby the line drawn between the 6 o'clock and 12 o'clock positions is vertical.

Moreover, if the shaft 14 is in an angular position such that an opening 54 is in a low position, as shown in FIG. 9, lubricant 60 present in the two compartments 50 and 52 of the cavity 30 can be stored in the cavity.

In an intermediary situation between the two aforementioned situations, the manner in which the lubricant can be stored within the cavity 30 is determined by the element the closest to the low position, from among a lubricant flow orifice 32 and an opening 54. Therefore, if the element the closest to the low position is a lubricant flow orifice 32, lubricant can be stored in the rear compartment 52 up to a height corresponding to the height of the opening 54 the closest to the low position, and lubricant can be stored in the front compartment 50 up to a height corresponding to the height of the lubricant flow orifice 32 the closest to the low position. However, if the element the closest to the low position is an opening 54, lubricant can be stored in the two compartments 50 and 52 up to a height corresponding to the height of the lubricant flow orifice 32 the closest to the low position.

The quantity of lubricant that can be stored in the cavity 30 therefore depends on the angular position of the shaft 14.

Regardless of this angular position, the configuration of the hydrodynamic bearing 16 nonetheless ensures that at least a minimum quantity of lubricant can be stored in the cavity 30.

As a result of the lubricant flow orifices 32 being distanced from the transverse wall 31A, the storage of lubricant in the cavity 30 is also possible when the shaft 14 is inclined relative to the horizontal direction, at least when the shaft 14 is oriented in a direction such that the air flow orifices 44 are positioned above the cavity 30.

During a subsequent bringing of the shaft 14 into rotation, the lubrication circuit could be delayed in supplying the annular space 22 via the lubricant supply orifice 24. In this case, the lubricant stored in the cavity 30 is progressively injected through each lubricant flow orifice 32 into the annular space 22 under centrifugal force. The lubricant originating from the cavity 30 forms a thin layer of lubricant between the outer annular bearing wall 18 and the inner annular bearing wall 20, at least allowing the hydrodynamic bearing 16 to operate in a so-called "boundary" lubrication mode. The lubricant originating from the cavity 30 therefore prevents the seizing of the hydrodynamic bearing until all of the lubricant previously stored in the cavity 30 has been consumed.

It is therefore clearly observed that:
  each opening 54 allows lubricant to flow between the two compartments 50 and 52 of the cavity 30 when the shaft 14 is driven in rotation, and thus allows the full quantity of lubricant present in the cavity 30 to reach the lubricant flow orifices 32, and that
  the partition wall 48 forms an obstacle to a flow of lubricant contained in the cavity 30, in this case in the rear compartment 52 thereof, under gravitational force towards any one of the lubricant flow orifices 32 when the shaft 14 is at a standstill.

It should be noted that alternatively, the lubricant flow orifices 32 can comprise orifices opening out into the front compartment 50 and other orifices opening out into the rear compartment 52 and circumferentially offset relative to the orifices opening out into the front compartment 50, without leaving the scope of the invention. In this case, when the shaft 14 is at a standstill and when one of the lubricant flow orifices 32 is in the low position, lubricant can be stored at least in the compartment that is not the compartment into which the orifice opens out.

Figure 10:
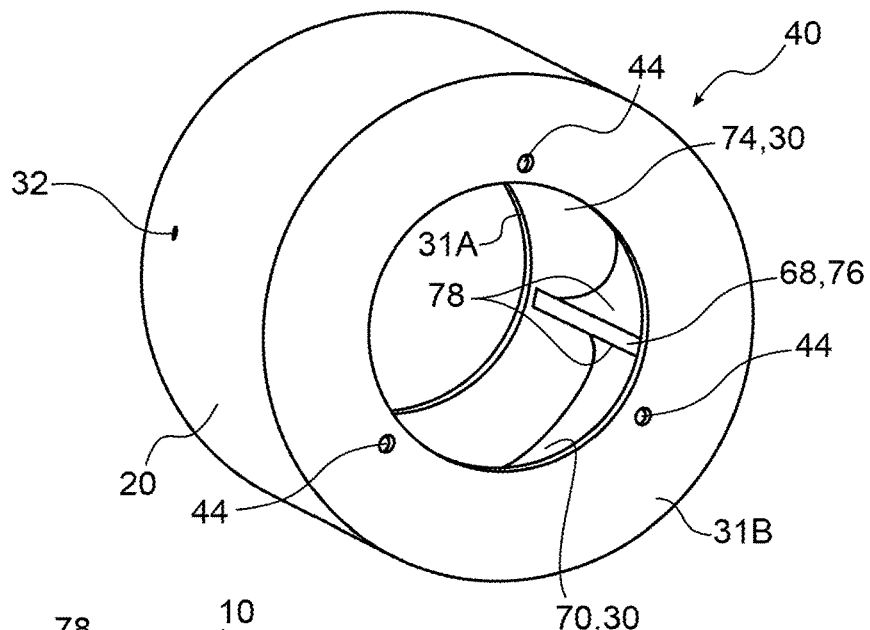
FIG. 10 is a perspective diagrammatic view of a ring forming a part of a hydrodynamic bearing according to a second preferred embodiment of the invention.
Figure 11:
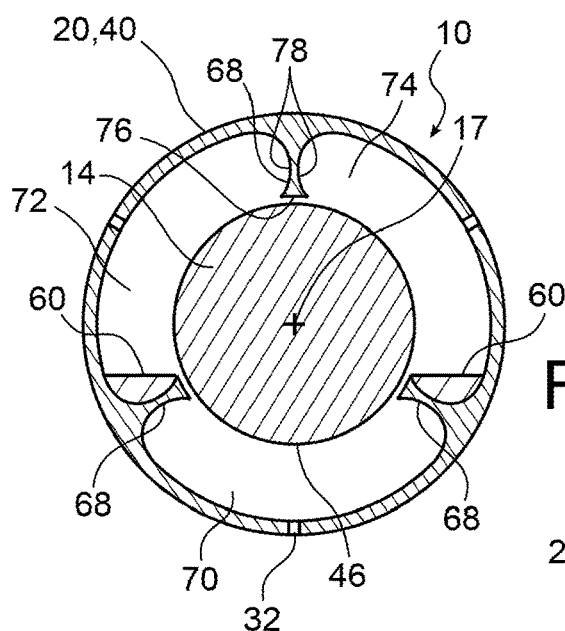
FIGS. 11 and 12 are diagrammatic views of a cross-section of the ring in FIG. 10, showing lubricant stored in the ring, respectively in two different angular positions of the ring.
Figure 12:
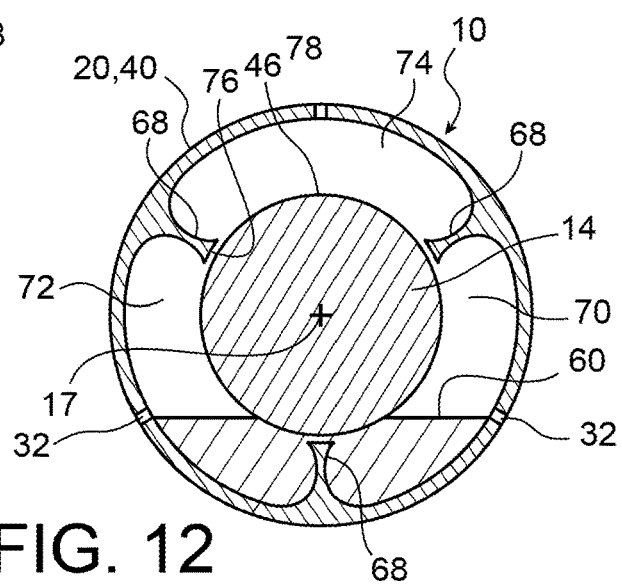
Figure 13:
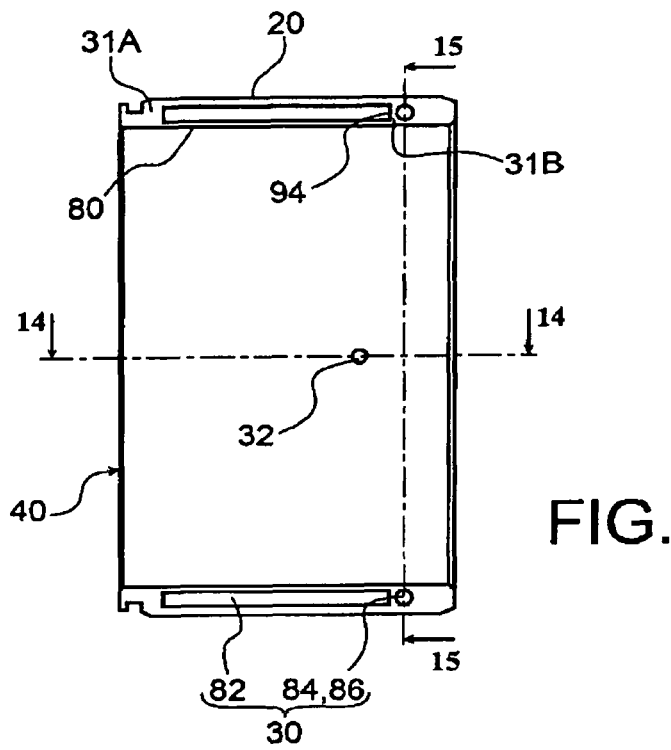
FIG. 13 is a diagrammatic view of an axial section of a ring forming a part of a hydrodynamic bearing according to a third preferred embodiment of the invention, along the plane 13-13 in FIG. 15.
Figure 14:
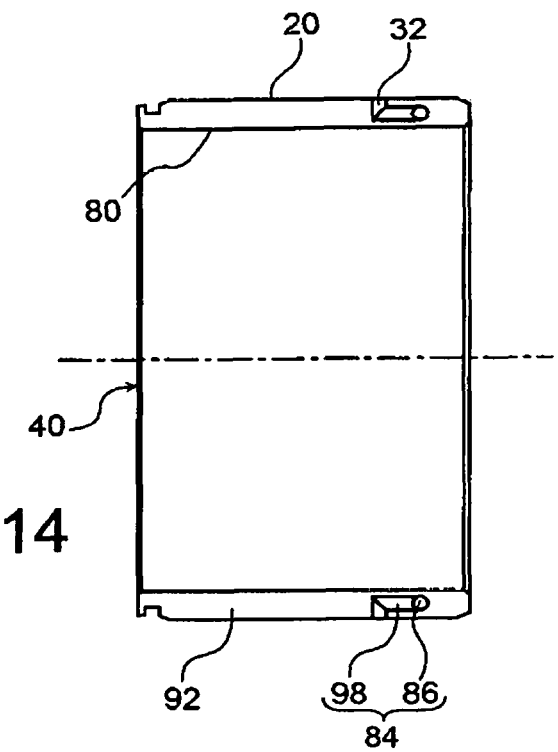
FIG. 14 is a diagrammatic view of an axial section of the ring in FIG. 13, along the plane 14-14 in FIG. 13.
Figure 15:
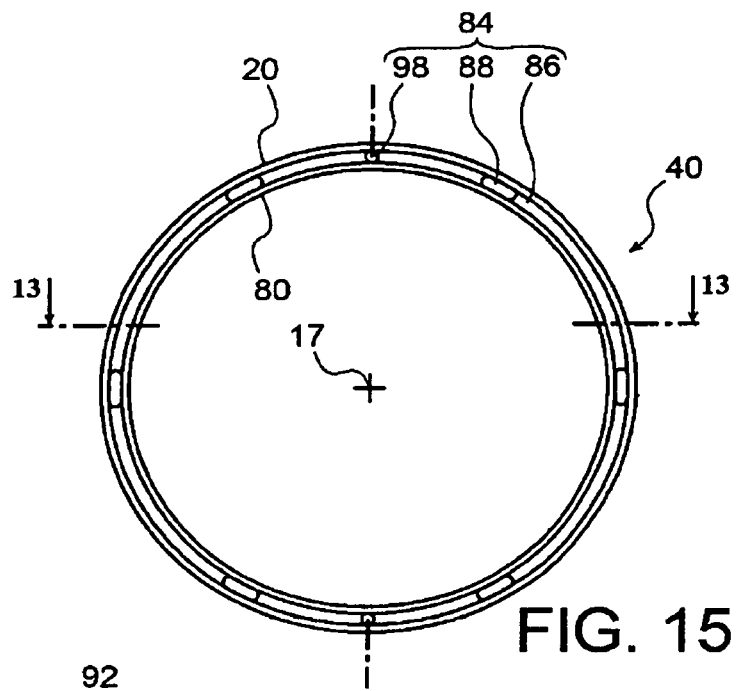
FIG. 15 is a diagrammatic view of a cross-section of the ring in FIG. 13, along the plane 15-15 in FIG. 13.
Figure 16:
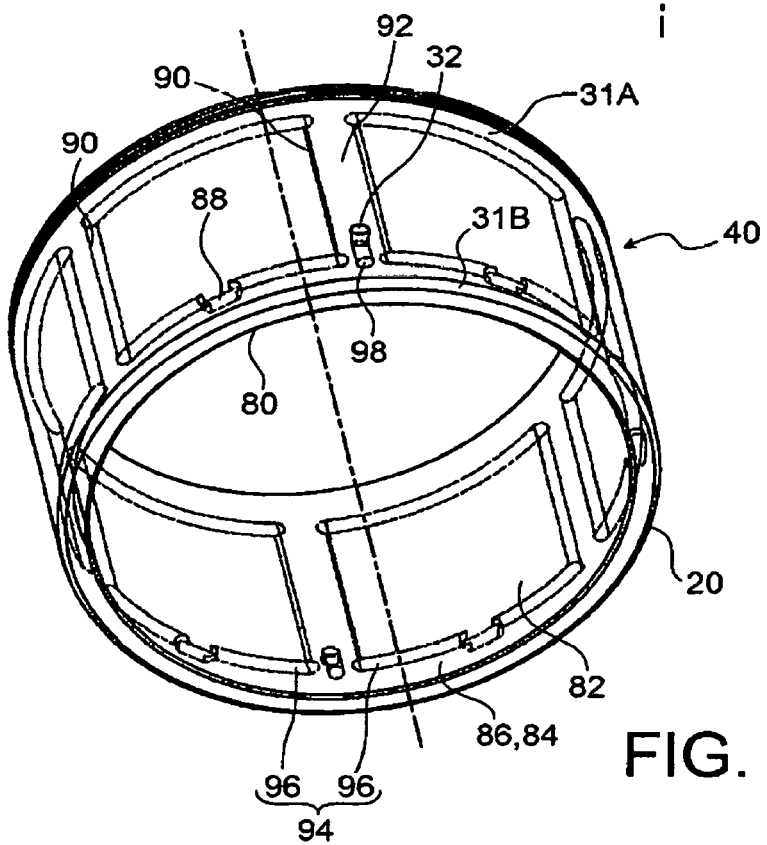
FIG. 16 is a perspective diagrammatic view of the ring in FIG. 13.

In the second preferred embodiment of the invention shown in FIGS. 10 to 12, the partitioning means comprise partition walls 68 extending longitudinally from one 31A to the other 31B of the transverse annular walls, so as to divide the cavity 30 into a plurality of compartments 70, 72, 74 distributed about the longitudinal axis, i.e. arranged circumferentially end-to-end. The partition walls 68 are circumferentially offset relative to each lubricant flow orifice 32.

In the example shown, there are three partition walls 68, and the same number of compartments 70, 72, 74 that the walls define, and of lubricant passage orifices 32.

The lubricant flow orifices 32 are regularly distributed about the longitudinal axis 17 so as to respectively open out into the three compartments 70, 72, 74.

The partition walls 68 are preferably arranged such that each lubricant flow orifice 32 is angularly at an equal distance from two consecutive partition walls 68.

By way of a preferred example, each of the partition walls 68 extends radially. This optimises the capacity of the walls to retain lubricant, and moreover eases the balance of the shaft 14 in rotation. Alternatively, the partition walls 68 can however be inclined relative to the radial direction without leaving the scope of the invention.

Furthermore, each of the partition walls 68 has a radially inner end 76 spaced apart from the shaft 14. This eases the assembly of the ring 40 onto the shaft 14 in addition to the removal of the ring 40. Alternatively, the radially inner end 76 of each of the partition walls 68 can come into contact with the shaft 14 without leaving the scope of the invention.

Moreover, each of the partition walls 68 preferably has two opposing surfaces 78 with a concave cross-section, which further optimises the capacity of each partition wall to retain lubricant, as described more clearly hereinbelow.

The operation of the hydrodynamic bearing 16 according to the second embodiment is similar on a whole to that of the hydrodynamic bearing 16 according to the first embodiment disclosed hereinabove.

In particular, FIGS. 11 and 12 show how a part of the lubricant remains inside the cavity 30, regardless of the angular position of the shaft 14, and thus of the ring 40, when the shaft 14 stops rotating.

Therefore, if the shaft 14 is in an angular position such that a lubricant flow orifice 32 is located in the low position, as shown in FIG. 11, the lubricant potentially present in the compartment 70 into which the orifice opens out will flow through the orifice into the annular space 22, under gravitational force G, and will potentially escape through the axial ends of the annular space 22. However, lubricant 60 present in the two other compartments 72 and 74 of the cavity 30 is retained by the two partition walls 68 respectively separating the two compartments 72 and 74 from the compartment 70. The retention of lubricant, when the shaft 14 is in the angular position, is increased by the fact that the surfaces 78 of the partition walls 68 have a concave cross-section, as shown in FIG. 11.

Moreover, if the shaft 14 is in an angular position such that the lubricant flow orifices 32 are all distant from the low position, as shown in FIG. 12, lubricant 60 present in the two compartments 70 and 72 of the cavity 30 that are the lowest can be stored in the two compartments 70 and 72.

The quantity of lubricant that can be stored in the cavity 30 again depends on the angular position of the shaft 14. Regardless of this angular position, the configuration of the hydrodynamic bearing 16 ensures that at least a minimum quantity of lubricant is stored in the cavity 30.

It is again clearly observed that each partition wall 68 can form an obstacle to a flow of lubricant contained in the cavity 30 under gravitational force, towards one of the lubricant flow orifices 32, when the shaft 14 is at a standstill.

FIGS. 13 to 16 show a ring 40 forming a part of a hydrodynamic bearing according to a third preferred embodiment of the invention. The hydrodynamic bearing is similar on a whole to the hydrodynamic bearings disclosed hereinabove, however is differentiated by the configuration of the ring 40.

The ring 40 comprises an inner annular ring wall 80 spaced apart from the inner annular bearing wall 20 and internally defining the annular cavity 30.

Furthermore, the partitioning means divide the cavity 30 into a plurality of compartments 82 circumferentially offset relative to the fluid connection means 32 and preferably regularly distributed about the longitudinal axis 17, and into a distribution channel 84 connecting each compartment 82 to the fluid connection means 32.

The distribution channel 84 comprises a circumferential portion 86 axially offset on the same side relative to each compartment 82 and to the fluid connection means 32, in addition to first connection portions 88 that respectively connect the compartments 82 to the circumferential portion 86 and that are angularly offset relative to circumferential ends 90 of each compartment 82.

In the example shown, the first connection portions 88 extend along the longitudinal direction.

Moreover, the fluid connection means comprise two lubricant flow orifices 32 that are diametrically opposite each other.

Furthermore there are, for example, six compartments 82.

The partitioning means thus comprise longitudinal partition walls 92 that extend between the compartments 82 and define the circumferential ends 90 of the compartments 82, and an annular partition wall 94 extending between the circumferential portion 86 of the distribution channel 84 and the compartments 82, and divided into a plurality of annular sectors 96 separated from each other by the first connection portions 88 and by second connection portions 98 forming a part of the distribution channel 84. The second connection portions 98 respectively connect the lubricant flow orifices 32 to the circumferential portion 86 of the distribution channel 84.

Each of the lubricant flow orifices 32 is located between two circumferentially consecutive compartments 82, and thus extends within a corresponding longitudinal partition wall 92.

The lubricant flow orifices 32 are therefore located axially on the same side of the circumferential portion 86 of the distribution channel 84 as the compartments 82. This specificity allows lubricant to be stored in at least the circumferential portion 86 of the distribution channel 84 when the shaft 14 is significantly inclined relative to the horizontal direction, such that the circumferential portion 86 of the distribution channel 84 is at least partially located in the low position.

It should be noted that the ring 40 as proposed in the third preferred embodiment of the invention can be made using additive manufacturing techniques, such as laser fusion or electron beam melting.

The operation of the hydrodynamic bearing according to the third embodiment is similar on a whole to that of the hydrodynamic bearing according to the second embodiment disclosed hereinabove.

It is clearly observed that regardless of the angular position of the shaft 14 at a standstill, lubricant can be stored in at least one of the compartments 82, and even in each of the compartments 82 with reference to the specific example shown in FIGS. 13 to 16, at least as long as the incline of the shaft 14 relative to the horizontal direction remains zero or low. In the event of a strong incline of the shaft 14, in particular if the shaft 14 takes on a substantially vertical orientation such that the distribution channel 84 is located in the low position, lubricant can be stored in the distribution channel 84, and potentially in the compartments 82, up to a height corresponding to the axial position of the lubricant flow orifices 32.

Figure 17:
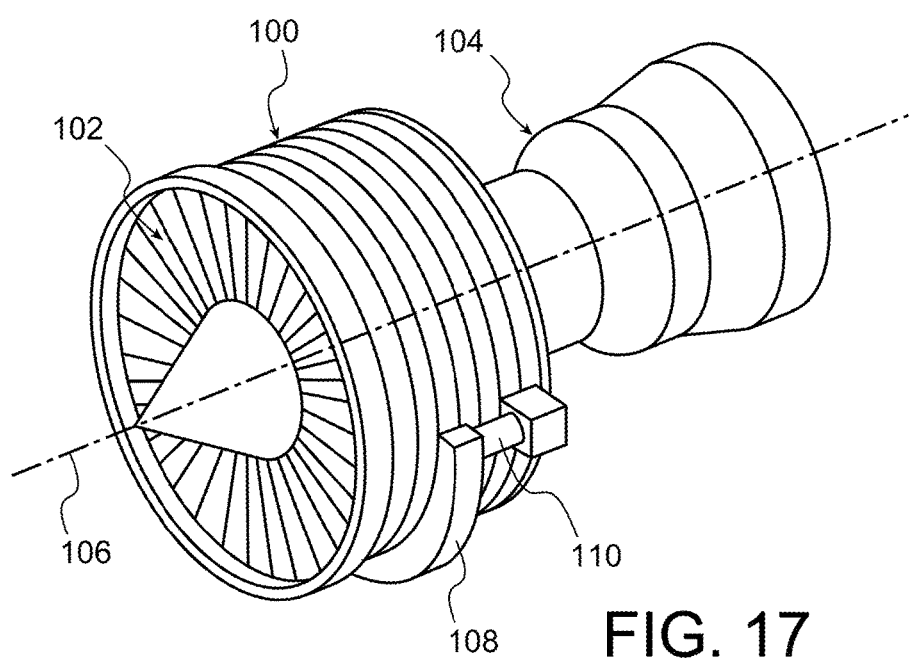
FIG. 17 is a partial, perspective, diagrammatic view of a turbomachine comprising a hydrodynamic bearing according to the invention.

FIG. 17 shows a turbomachine 100 for an aircraft, such as a dual-flow jet engine, comprising in a general manner a fan 102 intended to aspirate an air flow divided downstream of the fan into a primary flow supplying a core 104 of the turbomachine and a secondary flow bypassing the core. The core of the turbomachine comprises, in a general manner, a low-pressure compressor, a high-pressure compressor, a combustion chamber, a high-pressure turbine and a low-pressure turbine. The rotors of the turbomachine 100 are mounted such that they rotate about a longitudinal axis 106 of the turbomachine.

The turbomachine 100 in particular comprises an accessory gear box (AGB) 108 including an inner shaft (not shown in the figure) connected to a main rotor shaft of the turbomachine by means of a power take-off 110.

The inner shaft is, for example, mounted on a casing of the accessory gear box 108 by means of two roller bearings respectively arranged at the level of the axial ends of the shaft and by means of one hydrodynamic bearing of the type disclosed hereinabove, arranged between the axial ends of the shaft.

The casing, shaft and hydrodynamic bearing thus form an assembly 10 of the type disclosed hereinabove.

What is claimed is:

1. Hydrodynamic bearing (16) intended to guide a shaft (14) in rotation about a longitudinal axis (17) defined relative to a support (12),
   the hydrodynamic bearing comprising a stationary outer annular bearing wall (18) and a rotatable inner annular bearing wall (20) extending opposite the outer annular bearing wall (18) so as to provide an annular space (22) between the inner and outer annular bearing walls (18, 20),
   wherein the outer annular bearing wall (18) comprises at least one lubricant supply orifice (24) for supplying pressurised lubricant to said annular space (22) so as to form a load-bearing fluid film,
   wherein the hydrodynamic bearing (16) comprises a cavity (30) externally defined by the inner annular bearing wall (20) and axially defined by two transverse annular walls (31A, 31B) secured to the inner annular bearing wall (20) and arranged on both sides of the cavity (30),
   the inner annular bearing wall (20) comprising fluid connection means (32) that place the cavity (30) in fluid communication with said annular space (22),
   wherein the hydrodynamic bearing (16) further comprises partitioning means (48, 68, 92, 94) connected to the inner annular bearing wall (20) so as to divide the cavity (30) into a plurality of compartments (50, 52, 70, 72, 74, 82), the partitioning means forming an obstacle to a flow of lubricant contained in at least one of the compartments under gravitational force (G), towards the fluid connection means (32), regardless of an angular position of the inner annular bearing wall (20) when the inner annular bearing wall is at a standstill, such that the cavity (30) forms a lubricant reserve for a transient operating phase.

2. Hydrodynamic bearing according to claim 1, wherein the fluid connection means comprise a plurality of lubricant flow orifices (32) that pass through the inner annular bearing wall (20) and that are regularly distributed about the longitudinal axis (17).

3. Hydrodynamic bearing according to claim 1, comprising a ring (40) intended to be mounted on the shaft (14) such that the ring can be removed therefrom, said ring (40) integrating said inner annular bearing wall (20) in addition to said two transverse annular walls (31A, 31B).

4. Hydrodynamic bearing according to claim 1, wherein the partitioning means comprise a partition wall (48) of annular shape, dividing the cavity (30) into two compartments (50, 52) arranged one behind the other along the longitudinal axis (17), said partition wall comprising at least one opening (54) defined by the inner annular bearing wall (20) and circumferentially offset relative to the fluid connection means (32).

5. Hydrodynamic bearing according to claim 1, wherein the partitioning means comprise partition walls (68) extending longitudinally from one to the other of said transverse annular walls (31A, 31B), so as to divide the cavity (30) into a plurality of compartments (70, 72, 74) distributed about the longitudinal axis (17), the partition walls (68) being circumferentially offset relative to the fluid connection means (32).

6. Hydrodynamic bearing according to claim 1, wherein the partitioning means divide the cavity (30) into a plurality of compartments (82) circumferentially offset relative to the fluid connection means (32) and regularly distributed about the longitudinal axis (17), and into a distribution channel (84) connecting each compartment (82) to the fluid connection means (32) and comprising a circumferential portion (86) that is axially offset on a same side relative to each compartment (82) and the fluid connection means (32), in addition to first connection portions (88) that respectively connect the compartments (82) of the cavity to the circumferential portion (86) of the distribution channel and which are angularly offset relative to circumferential ends (90) of each compartment.

7. Hydrodynamic bearing according to claim 6, wherein the fluid connection means (32) are located axially on a same side of the circumferential portion (86) of the distribution channel (84) as the compartments (82) of the cavity (30).

8. Turbomachine (100), in particular for an aircraft, comprising a support (12), a shaft (14) and at least one hydrodynamic bearing (16) according to claim 1, the outer annular bearing wall (18) of which is secured to the support (12) and the inner annular bearing wall (20) of which is secured to the shaft (14), such that the hydrodynamic bearing (16) contributes to the guiding of the shaft (14) in rotation.

9. Turbomachine according to claim 8, wherein the shaft (14) forms a part of an accessory gear box (108) of the turbomachine.

10. Method for lubricating a hydrodynamic bearing (16) according claim 1, comprising:
   at least one transient operating phase wherein lubricant (60) previously stored in the cavity (30) is injected into said annular space (22) by passing through the fluid connection means (32) under centrifugal force, and
   a steady-state operating phase, wherein pressurised lubricant is supplied to said annular space (22) through each lubricant supply orifice (24), and a part of the lubricant penetrates the cavity (30) through the fluid connection means (32).

* * * * *